3,632,593
CERTAIN N-SUBSTITUTED AROMATIC AMIDINES

Jean Albert Gautier, Marcel Miocque, and Claude Fauran, Paris, and Albert Yves Le Cloarec, Saint-Maur, France, assignors to Dilalande S.A., Courbevoie, Hauts-de-Seine, France
No Drawing. Filed July 9, 1968, Ser. No. 743,332
Claims priority, application Great Britain, July 14, 1967, 32,426/67
Int. Cl. C07d 31/42
U.S. Cl. 260—296 R                    2 Claims

ABSTRACT OF THE DISCLOSURE

N-substituted aromatic amidines having the formula

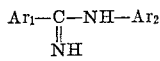

in which $Ar_1$ is an unsubstituted phenyl radical or a phenyl radical substituted by a halogen atom, a methoxy radical or a trifluoromethyl radical; an unsubstituted or substituted naphthyl radical or a pyridyl radical; and $Ar_2$ is an unsubstituted phenyl radical or a phenyl radical substituted by one or more halogen atoms, e.g. Cl, Br or F, by a trifluoromethyl radical, by alkyl radicals having 1 to 4 carbon atoms, or by one or more ether oxide group O—R, where R=—$CH_3$, —$C_2H_5$ or —$C_3H_7$; an unsubstituted or substituted naphthyl radical or a heterocyclic radical, such as a pyridyl radical.

A process for obtaining the amidines comprises reacting an aromatic amine with an aromatic nitrile using an alkaline amide as a condensation agent and by carrying out the reaction in liquid ammonia.

The amidines have therapeutic activity as analgesics, as analgesics, anti-inflammatory agents, neurosedative or psychoanaleptic agents, antipyretic agents, anti-hypertensive agents and hypotensive agents.

---

The present invention concerns new N-substituted aromatic amidines and a process for obtaining same.

The new compounds of the present invention correspond to the general formula:

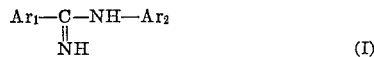

in which $Ar_1$ is an unsubstituted phenyl radical or a phenyl radical substituted by a halogen atom, a methoxy radical or a trifluoromethyl radical; an unsubstitued or substituted naphthyl radical or a pyridyl radical; and $Ar_2$ is an unsubstituted phenyl radical or a phenyl radical substituted by one or more halogen atoms, e.g. Cl, Br or F, by a trifluoromethyl radical, by alkyl radicals having 1 to 4 carbon atoms, or by one or more ether oxide groups O—R, where R=—$CH_3$, —$C_2H_5$ or —$C_3H_7$; an unsubstituted or substituted naphthyl radical or a heterocyclic radical, such as a pyridyl radical.

Various methods are known for obtaining amidines which, in general, utilize high temperatures and reactants such as aluminum chloride or sodium, which exert a degradative action on the various substituents of the aromatic or heterocyclic nuclei.

The process for obtaining the new amidines forming the object of the present invention in high yields is based on a new method of preparation of N-substituted amidines which comprises reacting an aromatic amine with an aromatic nitrile, using an alkaline amide (most frequently sodium amide) as condensation agent and by carrying out the reaction in liquid ammonia. This method may be represented by the following equation:

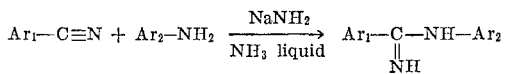

wherein $Ar_1$ and $Ar_2$ are as defined above.

The general method of preparation of the compounds according to the present invention is as follows:

0.1 mol of the amine $Ar_2$—$NH_2$ (in solution in 30 ml. of anhydrous ether or not) is added to a suspension of 0.1 mol of sodium amide in 300 ml. of liquid ammonia. After agitation of the mixture for 3 hours, the nitrile $Ar_1$—C≡N (in solution in anhydrous ether or not) is added. Agitation is continued under reflux for 3 hours. Then 0.1 mol of $NH_4Cl$ is added and the ammonia is removed by evaporation. The dry residue is taken up in 150 ml. of water and extracted three times with ether. After evaporation of the solvent, a solid crystallized residue is obtained.

The amidines obtained, when dissolved in an organic solvent and treated with a mineral or organic acid, give crystallized salts having definite melting points.

The following non-limitative examples illustrate the preparation of the present invention.

EXAMPLE 1.—N-(m-fluorophenyl)-benzamidine

Several crystals of ferric nitrate are added to 300 ml. of liquid ammonia and then 0.1 atom gram of sodium (2.3 g.) is gradually added thereto and the mixture is agitated until the complete formation of sodium amide is achieved (grey suspension). Then 0.1 mol of m-fluoroaniline is added thereto and after 3 hours under agitation 0.1 mol of benzonitrile is added. The mixture is agitated under reflux for 3 hours.

Then 0.1 mol of ammonium chloride is introduced into the mixture and the ammonia is removed by evaporation. The residue is taken up in 100 ml. of water and extracted three times with ether. The ether extract, on evaporation, gives a brown crystallized residue.

Recrystallization is effected in an acetone-petroleum ether mixture.

Yield=75%. Melting point =99° C.

Elementary analysis.—Calculated (percent): C, 72.88; H, 5.17; N, 13.08; F, 8.87. Found (percent): C, 73.03; H, 5.11; N, 13.00; F, 9.05.

EXAMPLE 2.—N-(3,4-dichlorophenyl) o-chlorobenzamidine 0.1 mol (16.2 g.) of anhydrous 3,4-dichloroaniline is added to a suspension of 0.1 ml. of sodium amide in 300 ml. of liquid ammonia. The mixture is of a green colour and is agitated for 3 hours. Then 0.1 mol (13.7 g.) of o-chlorobenzonitrile is added and the mixture is agitated under reflux for 3 hours and the mixture turns black. After adding 0.1 mol of ammonium chloride and evaporating the solvent, the residue is taken up in 100 ml. of water and is extracted with ether. The ether extract is evaporated and a brown crystallized residue is obtained, which is recrystallized in petroleum ether.

Yield=74%. Melting point=122° C.

Elementary analysis.—Calculated (percent): C, 52.11; H, 3.03; N, 9.35. Found (percent): C, 52.08; H, 3.23; N, 9.47.

EXAMPLE 3.—N-(p-chlorophenyl) α-naphthamidine 0.1 mol (12.7 g.) of p-chloroaniline is added to a suspension of 0.1 mol of sodium amide in 300 ml. of liquid ammonia. The mixture is green in colour and after 3 hours under agitation 0.1 mol (15.3 g.) of α-naphthonitrile is added thereto. The mixture is agitated under reflux for 3 hours. The mixture is then treated with ammonium chloride, the solvent is evaporated, the residue is taken up in water and then extracted with ether.

The ether extract, after evaporation yields a crystallized residue which is recrystallized in an acetone-heptane mixture.

Yield=82%. Melting point=158° C.

*Elementary analysis.*—Calculated (percent): C, 72.72; H, 4.67; 9.98. Found (percent): C, 72.79; H, 4.65; N, 9.78.

EXAMPLE 4.—N-(3,4-dichlorophenyl)-m-pyridylamidine 16.2 g. of 3,4-dichloroaniline is added to a suspension of 0.1 mol of sodium amide in 300 ml. of liquid ammonia and after 3 hours under agitation 10.4 g. of m-cyanopyridine is added thereof.

The reaction is continued for a further 3 hours. After the addition of ammonium chloride to the mixture and evaporation of the solvent, 200 ml. of water is added; a precipitate is formed which is dried and washed with water. After drying the precipitate is recrystallized in an ethyl acetate-petroleum ether mixture.

Yield=83%. Melting point=202° C.

*Elementary analysis.*—Calculated (percent): C, 54.15; H, 3.41; N, 15.79; Cl, 26.65. Found (percent): C, 54.19; H, 3.54; N, 15.60; Cl, 26.64.

EXAMPLE 5.—N-(4-methylphenyl)-m-pyridylamidine

To a suspension of sodium amide in liquid ammonia prepared as above, 10.7 g. of p-toluidine is added, and after 3 hours under agitation, 10.4 g. of m-cyanopyridine is added thereto. After having effected the same treatment as described in Example 4, the precipitate is dried, which after washing and drying is recrystallized in an ethyl acetate-petroleum ether mixture.

Yield=57%. Melting point=157° C.

*Elementary analysis.*—Calculated (percent): C, 73.56; H, 6.17; N, 20.27. Found (percent): C, 73.68; H, 6.27; N, 20.09.

The compounds appearing in the following tables have been prepared by the process described and illustrated in the above examples.

TABLE I

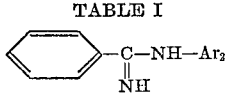

| $Ar_2$ | Melting point, ° C. | Yield, percent | Salt prepared | Melting point, ° C. |
|---|---|---|---|---|
| m-F—$C_6H_4$ | 99 | 75 | Hydrochloride | 200 |
| m-C$F_3$—$C_6H_4$ | 102 | 70 | do | 175 |
| o-O$CH_3$—$C_6H_4$ | 97 | 71 | do | 231 |
| 3-Cl.4-$CH_3C_6H_3$ | 108 | 83 | | |
| 2,5-diO $CH_3$—$C_6H_3$ | 92 | 75 | | |
| 3,4-diCl—$C_6H_3$ | 110 | 60 | Hydrochloride | 209 |
| 3,4,5-triO $CH_3$—$C_6H_2$ | 170 | 77 | do | 230 |
| o-OH—$C_6H_4$ | 143 | 67 | | |

TABLE II

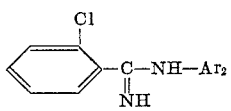

| $Ar_2$ | Melting point, ° C. | Yield, percent | Salt prepared | Melting point, ° C. |
|---|---|---|---|---|
| p-Cl—$C_6H_4$ | 127 | 65 | | |
| m-F—$C_6H_4$ | 105 | 80 | | |
| m-C$F_3$—$C_6H_4$ | 90 | 72 | | |
| o-O $CH_3$—$C_6H_4$ | 90 | 54 | | |
| p-O $CH_3$—$C_6H_4$ | 122 | 65 | | |
| α-Naphthyl | 110 | 65 | | |
| β-Naphthyl | 112 | 68 | | |
| 3-Cl4.$CH_3C_6H_3$ | 118 | 68 | | |
| 2,5-diO $CH_3$—$C_6H_3$ | 130 | 66 | | |
| 3,4-diCl—$C_6H_3$ | 122 | 74 | Hydrochloride | 201 |
| 3,4,5-triO $CH_3$—$C_6H_2$ | 171 | 70 | | |
| $C_6H_5$ | 102 | 87 | Hydrochloride | 173 |
| p-C$H_3$—$C_6H_4$ | 106 | 53 | | |

TABLE III

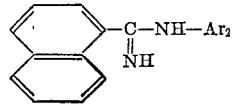

| $Ar_2$ | Melting point, ° C. | Yield, percent | Salt prepared | Melting point, ° C.: |
|---|---|---|---|---|
| o-O$CH_3$—$C_6H_4$ | 126 | 70 | | |
| p-Cl—$C_6H_4$ | 158 | 82 | Hydrochloride | 209 |
| p-O$CH_3$—$C_6H_4$ | 113 | 76 | | |
| 3-Cl4.$CH_3$—$C_6H_3$ | 128 | 58 | Hydrochloride | 201 |
| 2,5-diO$CH_3$—$C_6H_3$ | 144 | 26 | | |
| 3,4,5-triO$CH_3$—$C_6H_2$ | 172 | 67 | | |
| o-OH—$C_6H_4$ | 156 | 54 | | |
| p-OH—$C_6H_4$ | 202 | 62 | | |
| p-C$H_3$—$C_6H_4$ | 127 | 62 | | |

TABLE IV

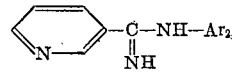

| $Ar_2$ | Melting point, ° C. | Yield, percent | Salt prepared | Melting point, ° C. |
|---|---|---|---|---|
| 3,4,5-triO$CH_3$—$C_6H_2$ | 136 | 81 | | |
| m-F—$C_6H_4$ | 171 | 81 | Dihydrochloride | 217 |
| m-C$F_3$—$C_6H_4$ | 172 | 69 | do | 182 |
| o-O$CH_3$—$C_6H_4$ | 108 | 58 | do | 211 |
| p-O$CH_3$—$C_6H_4$ | 143 | 77 | do | 209 |
| α-Naphthyl | 137 | 81 | do | 199 |
| β-Naphthyl | 189 | 77 | do | 221 |
| 2,5-di.O$CH_3$—$C_6H_3$ | | | do | 170 |
| 3,4-diCl—$C_6H_3$ | 202 | 83 | | |
| 3Cl4.$CH_3C_6H_3$ | 194 | 78 | Dihydrochloride | 222 |
| p-C$H_3$—$C_6H_4$ | 157 | 57 | | |

TABLE V

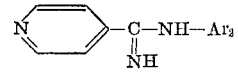

| $Ar_2$ | Melting point, ° C. | Yield, percent | Salt prepared | Melting point, ° C. |
|---|---|---|---|---|
| p-Cl—$C_6H_4$ | 133 | 78 | | |
| m-F—$C_6H_4$ | 122 | 84 | | |
| m-C$F_3$—$C_6H_4$ | 152 | 83 | Dihydrochloride | 156 |
| o-O$CH_3$—$C_6H_4$ | 125 | 58 | | |
| p-O$CH_3$—$C_6H_4$ | 148 | 75 | | |
| α-Naphthyl | 124 | 85 | | |
| β-Naphthyl | 148 | 61 | | |
| 3Cl4.$CH_3$—$C_6H_3$ | 135 | 65 | Dihydrochloride | 215 |
| 2,5-diO$CH_3$—$C_6H_3$ | 106 | 71 | | |
| 3,4-diCl—$C_6H_3$ | 63 | 68 | | |
| o-OH—$C_6H_4$ | 171 | 61 | | |
| $C_6H_5$ | 150 | 87 | | |
| p-C$H_3$—$C_6H_4$ | 126 | 76 | | |

The compounds of the present invention have been tested on animals in the laboratory and it has been found that these compounds possess a therapeutic activity.

Their DL 50 has been found to be completed with their pharmaceutical usage as shown in the following table.

| Ref. No. | Compounds of Formula I Ar₁ | Ar₂ | Lethal dose 50 in mg./kg. determined on mice |
|---|---|---|---|
| 1 | —C₆H₅ | m-CF₃—C₆H₄ | 580 |
| 2 | —C₆H₅ | 3,4-diCl—C₆H₃ | 760 |
| 3 | o-Cl—C₆H₄ | m-CF₃—C₆H₄ | >1000 |
| 4 | o-Cl—C₆H₄ | o-OCH₃—C₆H₄ | 200 |
| 5 | o-Cl—C₆H₄ | 3,4-diCl—C₆H₃ | >1000 |
| 6 | —C₆H₅ | m-F—C₆H₄ | 760 |
| 7 | o-Cl—C₆H₄ | p-Cl—C₆H₄ | >1000 |
| 8 | pyridyl (N in ring) | m-CF₃—C₆H₄ | >1000 |
| 9 | pyridyl (N in ring) | 3,4-diCl—C₆H₃ | >3000 |
| 10 | pyridyl (N in ring) | m-CF₃—C₆H₄ | 910 |
| 11 | pyridyl (N in ring) | p-Cl—C₆H₄ | 230 |
| 12 | naphthyl | p-Cl—C₆H₄ | >1000 |

The compounds of the present invention have shown:

(a) an analgesic action studied by according to the method of Siegmund (E), Cadmus (R) and Go Lu (Proceedings of the Society of Experimental Biology and Medicine, 1957, volume 95, page 729) which shows itself by an inhibition of the painful stretching caused by the intraperitoneal injection of phenylbenzoquinone;

EXAMPLES

| Compounds studied | Dose administered, mg./kg. | Protection, percent |
|---|---|---|
| No. 4 | 20 | 50 |
| No. 5 | 200 | 43 |
| No. 6 | 100 | 52 |
| No. 7 | 100 | 40 |
| No. 8 | 120 | 50 |
| No. 9 | 90 | 50 |
| No. 10 | 90 | 50 |
| No. 11 | 20 | 40 |
| No. 12 | 200 | 40 |

(b) an anti-inflammatory action studied according to the method of Winter (C. A.), Risley (E. A.) and Nuss (G. W.) (Proceedings of the Society of Experimental Biology and Medicine, 1962, volume 111, page 544) which shows itself by an inhibition of the Oedema under Plantar release caused by the local injection of carragenine on the rat;

EXAMPLES

| Compounds studied | Dose administered, mg./kg. | Protection, percent |
|---|---|---|
| No. 1 | 50 | 26 |
| No. 1 | 200 | 52 |
| No. 2 | 100 | 52 |
| No. 3 | 100 | 49 |
| No. 5 | 200 | 44 |
| No. 6 | 200 | 33 |
| No. 7 | 100 | 40 |

(c) a neurosedative or psychoanaleptic action studied by the behaviour: (1) according to the method of Kneip (P) (Archives Internationales de Pharmacodynamie et de Thérapie, 1960, volume 126, page 238) modified by Boissier (J. R.) Simon (P), Lwoff (J. M.) and Giudicelli (J. F.) (Thérapie, 1965, volume 120, page 895) which shows itself by an inhibition or an augmentation of the evasive actions on an inclined plane by the mouse;

EXAMPLES

| Compounds studied | Dose administered, mg./kg. | Effect |
|---|---|---|
| No. 3 | 200 | Augmentation of 45%. |
| No. 6 | 100 | Diminution of 46%. |
| No. 9 | 200 | Diminution of 50%. |

(2) by the measurement of the motility in a meter device having photoelectric cells;

Example

Compound studied: No. 9.
Dose administered: 100 mg./kg.
Effect: Hypomotility 50 percent.

(3) by the potentialisation of pentothal;
Compound studied: No. 9.
Dose administered: 175 mg./kg.
Potentialisation: 50 percent.

(d) an antipyretic action studied according to the technique of Benza (G), Crema (A) and Pausse Pesce (A) (Farmaco 1966, volume 21, page 485) which shows itself by an inhibition of the fever caused by the intramuscular injection of a suspension of balm on the rat;

(e) an antihypertensive action observed on a rat rendered hypertensive by a renal or perinephritic cellophane ligature or an overdose of desoxycorticosterone acetate with unilateral nephrectomy, and (f) a hypotensive action observed in the rat, rabbit, cat and dog which is manifested by a progressive and durable tensional fall.

EXAMPLE

| Compound studied | | Dose administered provoking a prolonged hypotension |
|---|---|---|
| Ar₁ | Ar₂ | |
| 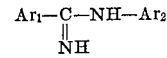 | p-CH₃—C₆H₄ | 1 mg./kg./IV |

What we claim is:
1. A compound of the formula

$$Ar_1-\underset{\underset{NH}{\|}}{C}-NH-Ar_2 \qquad (I)$$

in which Ar₁ and Ar₂ are radicals selected from the respective groups tabulated below and used in the combinations of Ar₁ and Ar₂ as tabulated below.

| Ar₁ | Ar₂ |
|---|---|
| 1. Phenyl | 1. Trifluoromethylphenyl, 3,4-dichlorophenyl, 2,5-dimethoxyphenyl, 3,4,5-trimethoxyphenyl and 3-chloro-4-methylphenyl. |
| 2. Chlorophenyl and 3-pyridyl. | 2. Trifluoromethylphenyl, 2,5-dimethoxyphenyl, 3,4,5-trimethoxyphenyl, 3,4-dichlorophenyl and 3-chloro-4-methylphenyl, phenyl substituted with an alkyl radical having 1 to 4 carbon atoms, phenyl substituted with an alkoxy radical having 1 to 3 carbon atoms, α-naphthyl and β-naphthyl. |
| 3. 4-pyridyl | 3. Trifluoromethylphenyl, 2,5-dimethoxyphenyl, 3,4,5-trimethoxyphenyl, 3,4-dichlorophenyl and 3-chloro-4-methylphenyl, phenyl substituted with an alkyl radical having 1 to 4 carbon atoms, phenyl substituted with an alkoxy radical having 1 to 3 carbon atoms, α-naphthyl and β-naphthyl and phenyl. |
| 4. α-naphthyl | 4. Trifluoromethylphenyl, hydroxyphenyl, halogen-substituted phenyl, 2,5-dimethoxyphenyl, 3,4,5-trimethoxyphenyl, 3,4-dichlorophenyl and 3-chloro-4-methylphenyl. | and the pharmacologically acceptable acid addition salts thereof.

2. A compound according to claim 1 in which $Ar_1$ is 3-pyridyl and $Ar_2$ is 3,4-dichlorophenyl.

References Cited

Klingsberg, Pyridine and Derivatives, Part 3, Interscience (1962) pp. 27, 28, 147 and 148.

Goodwin et al. Chem. Abstracts, vol. 39, p. 4396 (1945).

Sidgewick's Organic Chemistry of Nitrogen, Oxford, 3rd ed. p. 245 (1966).

Robev, Chem. Abstracts II, vol. 55, p. 18676 (1961).

Misra et al. Chem. Abstracts III, vol. 57, p. 4609 (1962). Chem. Abstracts IV, vol. 65 pp. 10577–10578 (1966).

ALAN L. ROTMAN, Primary Examiner

U.S. Cl. X.R.

260—564 A, 999